United States Patent [19]

Hughes et al.

[11] 3,819,956

[45] June 25, 1974

[54] LOCKOUT MEANS FOR THYRISTOR FIRING CIRCUIT

[75] Inventors: Ronald W. Hughes, Stow; Mikel Jay Messick, Chagrin Falls; John Rodgers Volpe, Bedford Heights, all of Ohio

[73] Assignee: Square D Company, Park Ridge, Ill.

[22] Filed: July 20, 1972

[21] Appl. No.: 273,562

[52] U.S. Cl. .................. 307/254, 307/247, 307/282, 307/314, 307/315

[51] Int. Cl. .......................................... H03k 17/00

[58] Field of Search ........... 307/314, 270, 237, 282, 307/247

[56] References Cited

UNITED STATES PATENTS

| | | | |
|---|---|---|---|
| 3,128,396 | 4/1964 | Morgan | 307/202 X |
| 3,140,400 | 7/1964 | Shansky et al. | 307/270 X |
| 3,182,249 | 5/1965 | Pahlavan | 307/314 X |
| 3,328,123 | 10/1967 | Morgan | 307/314 |
| 3,466,462 | 9/1969 | Hounsome | 307/314 |
| 3,746,888 | 7/1973 | Wentworth | 307/314 |

*Primary Examiner*—Rudolph V. Rolinec
*Assistant Examiner*—B. P. Davis
*Attorney, Agent, or Firm*—Richard T. Guttman; Harold J. Rathbun; William H. Schmeling

[57] ABSTRACT

A thyristor firing circuit uses saturable transformers to transmit firing pulses to the thyristors. A lockout circuit causes a constant voltage to be applied to the transformer primaries to saturate the transformers so that neither circuit noise nor transients can produce firing pulses in the secondary windings.

5 Claims, 1 Drawing Figure

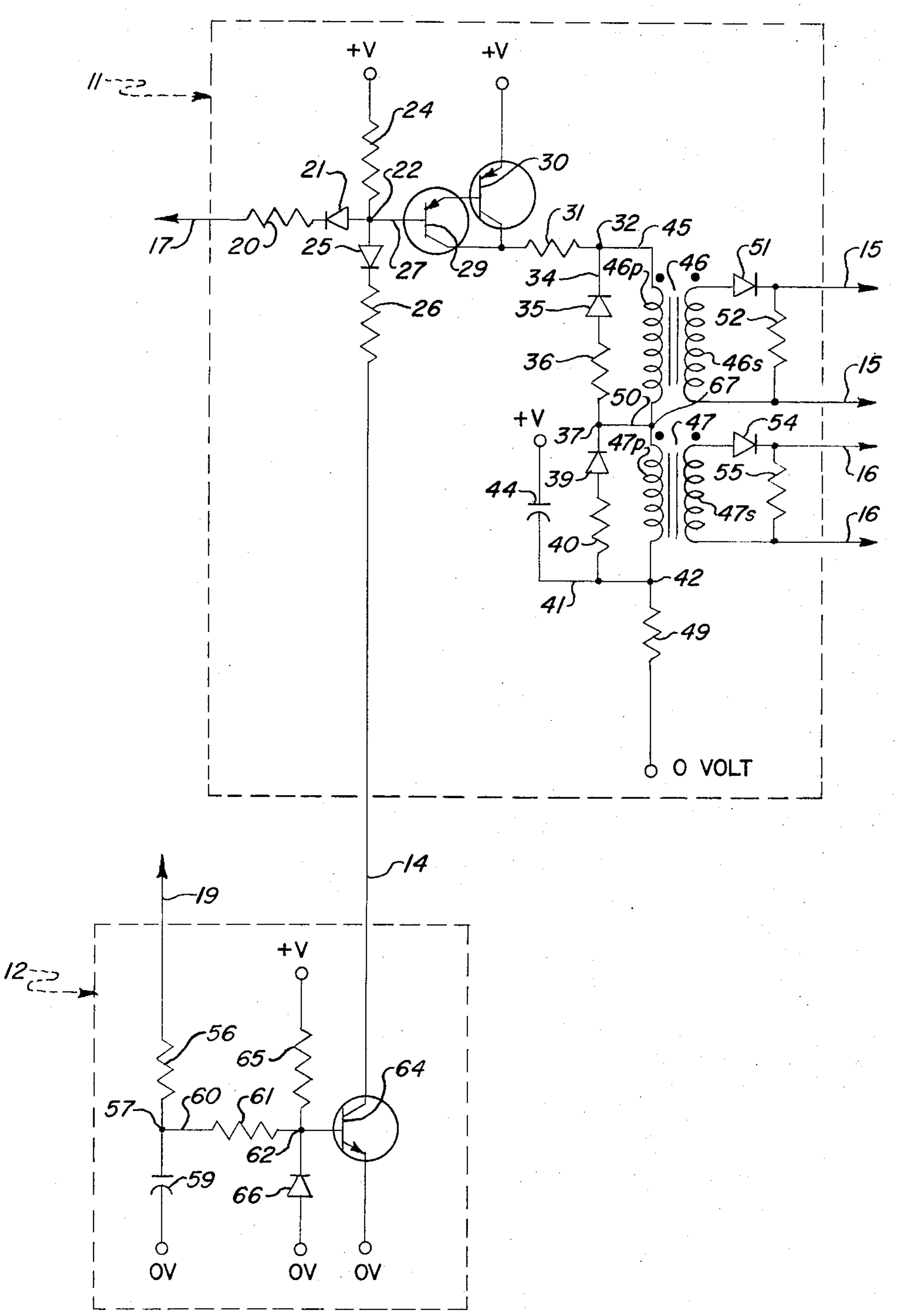
+V
+V
+V
+V
O VOLT
OV
OV
OV
11
12
14
15
16
17
19

LOCKOUT MEANS FOR THYRISTOR FIRING CIRCUIT

This invention relates to thyristor firing circuits and more particularly to a lockout circuit which positively prevents the inadvertent application of firing pulses to thyristors controlled by the firing circuit and cannot be defeated by circuit noise or transients.

Prior art lockout circuits generally include switching means which require some change in applied voltage in the form of a permissive signal to turn on the switching means to permit application of firing pulses to the controlled thyristors. However, voltage spikes or circuit noise may operate the switching means, thus permitting the inadvertent application of firing pulses to the thyristors. Clearly, such a lockout circuit cannot be totally effective and may produce unsafe conditions.

It is an object of this invention to provide a lockout means for a thyristor firing circuit which positively prevents the application of firing pulses to the controlled thyristors and which is unaffected by voltage transients or circuit noise.

This and other objects and advantages of this invention will be apparent from the specification when read in conjunction with the appended drawing illustrating a thyristor firing circuit and lockout circuit in accordance with this invention.

Referring now to the drawing, a thyristor firing circuit 11 and a lockout circuit 12 are interconnected by a conductor 14. Pairs of conductors 15 and 16 connect the thyristor firing circuit 11 to thyristors to be controlled (not shown). Input voltage is applied to the thyristor firing circuit 11 through a conductor 17 and a lockout control signal is applied to the lockout circuit 12 through a conductor 19.

The conductor 17 is connected through a resistor 20 and a diode 21 to a junction 22. The junction 22 is connected through a resistor 24 to a source of positive voltage, through a diode 25 and a resistor 26 to the conductor 14, and by a conductor 27 to the base of a transistor 29.

The emitter of the transistor 29 is connected to the base of a transistor 30 which has its emitter connected to a source of positive voltage. The collectors of the transistors 29 and 30 are connected to each other and through a resistor 31 to a junction 32.

A conductor 34 connects the junction 32 through a diode 35, a resistor 36, a junction 37, a diode 39, and a resistor 40 to a conductor 41. The conductor 41 connects a junction 42 through a capacitor 44 to a source of positive voltage. A conductor 45 connects the junction 32 through a primary winding **46*p* of a saturable transformer 46 and a primary winding 47*p* of a saturable transformer 47 to the junction 42. A resistor 49 is connected between the junction 42 and a point of zero voltage. A conductor 50 connects the junction 37 to a junction 67 between the transformer primary windings 46*p* and 47*p*.**

A secondary winding **46*s* of the transformer 46 is connected to the pair of conductors 15 with a diode 51 interposed in one of the conductors 15. A resistor 52 is connected across the conductors 15. A secondary winding 47*s* of the transformer 47 is connected to the pair of conductors 16 with a diode 54 interposed in one of the conductors 16. A resistor 55 is connected across the conductors 16.**

Referring now to the lockout circuit 12, the conductor 19 is connected through a resistor 56 to a junction 57. The junction 57 is connected through a capacitor 59 to a point of zero voltage and by a conductor 60 through a resistor 61 and a junction 62 to the base of a transistor 64. The junction 62 is connected through a resistor 65 to a source of positive voltage and through a diode 66 to a point of zero voltage. The collector-emitter circuit of the transistor 64 connects the conductor 14 to a point of zero voltage.

Operation of the thyristor firing circuit 11 will now be described. When firing of the thyristors controlled by the firing circuit 11 is not required, a constant positive voltage is applied through the conductor 17 and blocked by the diode 21 so that the voltage at the junction 22 is the positive biasing voltage applied through the resistor 24. This voltage biases the transistors 29 and 30 into a non-conducting condition and permits the capacitor 44 to be charged.

When it is desired to fire the thyristors controlled by the thyristor firing circuit 11, negative voltage pulses are applied through the conductor 17 switching the transistors 29 and 30 repeatedly between their conducting and non-conducting conditions and discharging the capacitor 44 through the transformer primary windings **46*p* and 47*p* so that operating pulses are induced in the transformer secondary windings 46*s* and 47*s* to fire the thyristors through the pairs of conductors 15 and 16,** respectively.

It should be evident that circuit noise or voltage transients in the conductor 17 could turn on the transistors 29 and 30 and thus cause firing pulses to be induced in the transformer secondary windings **46*s* and 47*s* when firing of the thyristors is not desired. The lockout circuit 12 is provided to prevent such inadvertent thyristor firing. When normal operation of the thyristor firing circuit 11 is desired, a negative voltage is applied to the lockout circuit 12 through the conductor 19. Under these conditions, the transistor 64 is turned off and the thyristor firing circuit 11** functions normally.

However, if it is desired to lock out the thyristor firing circuit 11, a positive voltage is applied through the conductor 19 which turns on the transistor 64. Because the transistor 64 is connected between the junction 22 of the thyristor firing circuit 11 and a point of zero voltage, the transistors 29 and 30 are turned on and remain in the conducting condition regardless of any voltage applied through the conductor 17. Continued conduction of the transistors 29 and 30 rapidly saturates the transformers 46 and 47 so that gating pulses cannot be induced in the transformer secondary windings **46*s* and 47*s*.** The controlled thyristors thus remain in a non-conducting state.

Should circuit noise or voltage transients appear anywhere in the thyristor firing circuit 11, the saturated condition of the transformers 46 and 47 prevents the voltage signals from firing the thyristors.

In this manner, a lockout means is provided for a thyristor firing circuit which positively prevents the application of gating pulses to the thyristors controlled thereby even during the occurrence of circuit noise or voltage transients.

We claim:

1. A thyristor firing circuit comprising: a direct current source, a saturable transformer having a primary and a secondary winding, switching means having a pair of inputs connected to a pulsating signal source and a pair of outputs connected between the primary winding and the direct current source for supplying pulses of direct current to the primary winding in response to the input signal pulses for causing the secondary winding to produce output thyristor firing pulses, and lockout firing means having an output for causing the switching means to conduct continuously for causing a continuous direct current flow in the primary winding to saturate the saturable transformer to prevent the secondary winding from producing output thyristor firing pulses in response to the input signal pulses.

2. The firing circuit as recited in claim 1 wherein the switching means includes a transistor having an emitter and collector connected in series with the primary winding and a base connected to the pulsating signal source.

3. The firing circuit as recited in claim 2 wherein the output of the lockout means is applied to the base of the transistor.

4. The firing circuit as recited in claim 3 wherein the output of the lockout means causes the transistor to be conductive.

5. The firing circuit as recited in claim 1 wherein the pulsating signal source causes the switching means to repeatedly switch between a conducting and non-conducting condition and the lockout means includes means for applying a continuous signal to the switching means to maintain the switching means in its conducting condition thereby causing saturation of the saturable transformer.

* * * * *